United States Patent

Moolenaar et al.

[11] Patent Number: 5,818,971
[45] Date of Patent: Oct. 6, 1998

[54] METHOD AND IMAGE REPRODUCTION DEVICE FOR REPRODUCING GREY VALUES USING A COMBINATION OF ERROR DIFFUSION AND CLUSTER DITHERING FOR ENHANCED RESOLUTION AND TONE

[75] Inventors: Abraham Moolenaar; Petrus Antonius M. Cornelissen, both of Venlo, Netherlands

[73] Assignee: OCE-Nederland B.V., Venlo, Netherlands

[21] Appl. No.: 755,564

[22] Filed: Nov. 27, 1996

[30] Foreign Application Priority Data

Nov. 30, 1995 [NL] Netherlands .............................. 1001788

[51] Int. Cl.⁶ .............................. G06K 9/38; H04N 1/405
[52] U.S. Cl. .......................... 382/252; 382/237; 382/270; 358/456; 358/457; 358/458
[58] Field of Search ...................................... 382/252, 237, 382/251, 270; 358/456, 457, 458, 466, 298; 395/109

[56] References Cited

U.S. PATENT DOCUMENTS

| 5,077,615 | 12/1991 | Tsuji | 358/456 |
| 5,268,774 | 12/1993 | Eschbach | 358/466 |
| 5,321,525 | 6/1994 | Hains | 358/456 |
| 5,339,171 | 8/1994 | Fujisawa et al. | |
| 5,363,210 | 11/1994 | Sasaki et al. | |
| 5,374,997 | 12/1994 | Eschbach | 358/466 |

FOREIGN PATENT DOCUMENTS

| 201674 | 2/1986 | European Pat. Off. |
| 291300 | 5/1988 | European Pat. Off. |
| 581561 | 7/1993 | European Pat. Off. |

OTHER PUBLICATIONS

A Survey of Electronic Techniques for Pictorial Image Reproduction, J.S. Stoffel et al, IEEE Transactions on Communication, vol. COM–29, No. 12, Dec. 1981.

"Digital Halftoning" by Robert Ulichney, MIT Press, 1987, Chapter 8.

Primary Examiner—Scott Rogers
Attorney, Agent, or Firm—Birch, Stewart, Kolasch & Birch, LLP

[57] ABSTRACT

The invention relates to a method and device for reproducing grey values by reproducing pixels with specific dimensions and degrees of coverage. Use is made of a method based on error diffusion, wherein no clustering of identical pixels is the objective in edge zones while such clustering is the objective outside such zones.

21 Claims, 9 Drawing Sheets

METHOD AND IMAGE REPRODUCTION DEVICE FOR REPRODUCING GREY VALUES USING A COMBINATION OF ERROR DIFFUSION AND CLUSTER DITHERING FOR ENHANCED RESOLUTION AND TONE

BACKGROUND OF THE INVENTION

Field of the Invention

The invention relates to a method of reproducing grey values by allocating pixel values to pixels of an image divided up into groups of contiguous pixels, on a reproduction medium, wherein a pixel corresponds to a zone of a required size and a degree of coverage corresponding to a pixel value. The method comprises the steps of per grey value for a group of pixels: selecting a group value from a set of possible group values, determining a quantizing error which is the difference between the selected group value and the grey value, dividing at least a part of the quantizing error over grey values for neighboring groups of pixels, and allocating pixel values to the pixels of the group of pixels on the basis of the group value.

The invention also relates to an image reproduction device for performing this method.

DESCRIPTION OF BACKGROUND ART

A method of this kind for reproducing grey values by means of discrete pixels with a limited number of possible degrees of coverage is known by the name error diffusion. This method is described inter alia, for example, in "Digital Halftoning" by Ulichney, Robert, MIT Press, 1987, Chapter 8. In this method, a grey value of a pixel, in which, for example 256 possible grey values can be represented by a digital 8-bit word, is converted to a pixel value corresponding to a reproducible degree of coverage. In a printer based on electrophotography or an ink jet printer, there are generally only two reproducible degrees of coverage possible: white or black. This is based on the presence or absence of a fixed feed of toner powder or ink. In such a case there are only two possible pixel values for a pixel for reproduction. The quantizing error made by going from 256 grey values to 2 grey values, is divided over grey values of a number of neighboring pixels in accordance with a specific division. Various possible divisions are described in Ulichney, e.g. the Floyd and Steinberg division. By thus correcting the grey values of surrounding pixels for an earlier quantizing error, the correct grey value impression is finally obtained by averaging over a number of pixels.

It should be noted that a method of reproducing grey tints by means of just two degrees of coverage is referred to as "halftoning." Averaged over a number of pixels a specific grey value impression is obtained by a specific ratio of located black and white pixels.

If the separate pixels are arranged in groups of contiguous pixels, e.g. in blocks of 2×2 or 1×4 pixels, these pixels can be activated as a group. A group value can then reproduce the number of identical pixels in a group. In the example of 4 pixels in a group, the group value can reproduce whether there are 0, 1, 2, 3 or 4 black pixels. This corresponds to an average degree of coverage for the group of 0, 25, 50, 75 or 100%. Despite the fact that there are more than two degrees of coverage available for a group, there will always be a quantizing error in reproducing a grey value consisting of 8 bits or 256 levels by a group of pixels having only five different degrees of coverage.

In specific embodiments, the pixels of a group cannot even be separately addressed in the sense of activating an individual pixel in a group. Activation is then restricted to specifying the number of pixels which are given a specific pixel value. Pixels of this kind are also designated sub-pixels.

European patent application No. EPA 0 201 674, filed in the name of G. Goertzel, describes a method in accordance with the above preamble. In this, grey values are reproduced by reproducing groups of pixels having predetermined patterns of pixel values. Since only a limited number of patterns is possible and hence a limited number of degrees of coverage, a quantizing error occurs here as well. This is spread over neighboring groups with error diffusion.

One consequence of a method such as error diffusion is the incidence of loose isolated pixels. This in turn means that reproduction of the pixels on the reproduction medium must satisfy high requirements. The pixels must in fact be stable and capable of reproducible reproduction to give the required grey value impression. Frequently, however, the highest possible resolution is required and hence minimal pixel dimensions. In combination with error diffusion this can give rise to problems with regard to the reproducibility of pixels.

Despite the arrangement of pixels in groups, there is also the possibility of a loose isolated pixel occurring within a group in the above application.

This problem of isolated pixels in the case of error diffusion is referred to in European patent application No. EP 0 581 561 which was filed in the name of R. Eschbach. The solution described therein is based on locating a minimum number of contiguous pixels having identical pixel values. A preliminary pixel value selected by error diffusion for a pixel is compared with pixel values of preceding pixels. If this selected preliminary pixel value is identical to the previous pixel value or if a minimum number of contiguous pixels is printed with one and the same pixel value, the preliminary pixel value is considered a final pixel value. Otherwise a different opposite pixel value is taken as the final pixel value.

The said minimum number is determined by the minimum size of a cluster of pixels for reproduction.

The disadvantage of this method, however, is that resolution is sacrificed. As a result of the clustering, details are now reproduced less satisfactorily. The higher resolution was precisely the advantage of a method such as error diffusion with respect to another halftoning method such as dithering.

SUMMARY AND OBJECTS OF THE INVENTION

The object of the method according to the present invention is to obviate this disadvantage, and to this end the invention is characterized by allocating pixel values to pixels of the group of pixels in accordance either with a first instruction or in accordance with a second instruction differing therefrom, the second instruction differing from the first by exclusively allocating mutually identical pixel values to two or more contiguous pixels of the group of pixels and selecting one of these instructions on the basis of a predetermined selection criterion based on grey values for neighboring pixel groups or pixel values of neighboring pixels.

By only clustering pixels where this is necessary in accordance with an appropriate selection criterion, the adverse effect of reduced resolution can remain confined to zones where pixel clustering gives advantages. The normal high resolution can be retained where clustering is unnecessary.

One advantageous method is obtained by distinguishing pixels which form part of edge zones in the image, in accordance with the selection criterion, allocating pixel values in accordance with the first instruction to the pixels which correspond to an edge zone and allocating pixel values according to the second instruction to the other pixels.

This is based on the principle that arbitrary clustering of pixels is not desired at edges because that is precisely where high resolution is required. The fact that the possibility of loose pixels is now permitted at edges has surprisingly been found to have no disturbing effect. This is because isolated pixels in edge zones appear to occur less frequently than in the non-edge zones. In edge zones, where there may be said to be a rapid transition of optical density, there is already a certain clustering directed towards the edge in order to effect this rapid transition. An edge-sharpening processing will also frequently contribute to a specific degree of edge-directed clustering at edges. This is a clustering such as to contribute to the sharpness of an edge in comparison with an arbitrary clustering. The incidental inaccurate printing of an isolated pixel in an edge zone will accordingly occur less rapidly.

One advantageous method wherein at least a number of possible group values each correspond to two or more contiguous pixels with mutually identical degrees of coverage in the group, is obtained by dividing the set of group values into a first subset of group values and a second subset of group values wherein the first subset can comprise the complete set and the second set only contains group values which correspond to two or more contiguous pixels having mutually identical pixel values in the group of pixels, the method further comprising: selecting a group value from the first set of group values in accordance with the first instruction, and selecting a group value from the second set of group values in accordance with the second instruction.

By excluding in the second set group values which do not lead to clustered pixels, it is a simple matter to use an existing group filling. There is practically no need to change the method whereby pixels are finally located. A required clustering of this kind is obtained by activating with specific group values.

A first embodiment comprising allocating pixel values in a group of pixels in accordance with a dither matrix of the dot-centered type, wherein the separate group values correspond to the separate dither matrix levels, is obtained by selecting from all the group values in accordance with the first instruction and selecting from a first and a second group value corresponding to the minimum and maximum dither matrix levels respectively in accordance with the second instruction.

Another embodiment is obtained by allocating pixel values in accordance with a dither matrix of the dot-distributed type according to the first instruction and allocating pixel values according to a dither matrix of the dot-centered type in accordance with the second instruction. In the latter case a dot is of a minimum size of two pixels.

In a dither matrix, each pixel corresponds to a specific grey value threshold. The number of pixels located depends on how many grey value thresholds in the dither matrix are exceeded by the group value for reproduction. A dither matrix of the dot-centered type comprises a nucleus from which the separate pixels are located contiguously. This is contrast with dither matrices of the dispersed type where the pixels are located more spread over the dither matrix. By actuating with just two group values, e.g. those corresponding to white and black, either no individual level or else all the levels are exceeded. Then either no individual pixel is reproduced or precisely all the pixels having the same pixel value are reproduced.

A second embodiment comprising allocating pixel values to a group of not separately addressable pixels wherein the group values correspond to a number of pixels for reproduction in the group, is characterized by selecting from all the group values in accordance with the first method and selecting from a first and a second group value respectively corresponding to the minimum and maximum number of pixels for reproduction in the group in accordance with the second method.

These pixels which cannot be separately addressed are also designated sub-pixels. These are activated by a number of pixels for reproduction. In practice, for reproducibility reasons, they are frequently also located contiguously. The size of a cluster of sub-pixels is thus determined by specifying with a number. In the case of a selection from two group values, e.g. just white and black, the sub-pixels are then either all reproduced which do have, or only all those which do not have, the same pixel value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The method and device according to the invention will be explained with reference to the following drawings wherein.

DETAILED DESCRIPTION OF THE PREFERRED EMBODIMENT

Figure 1:
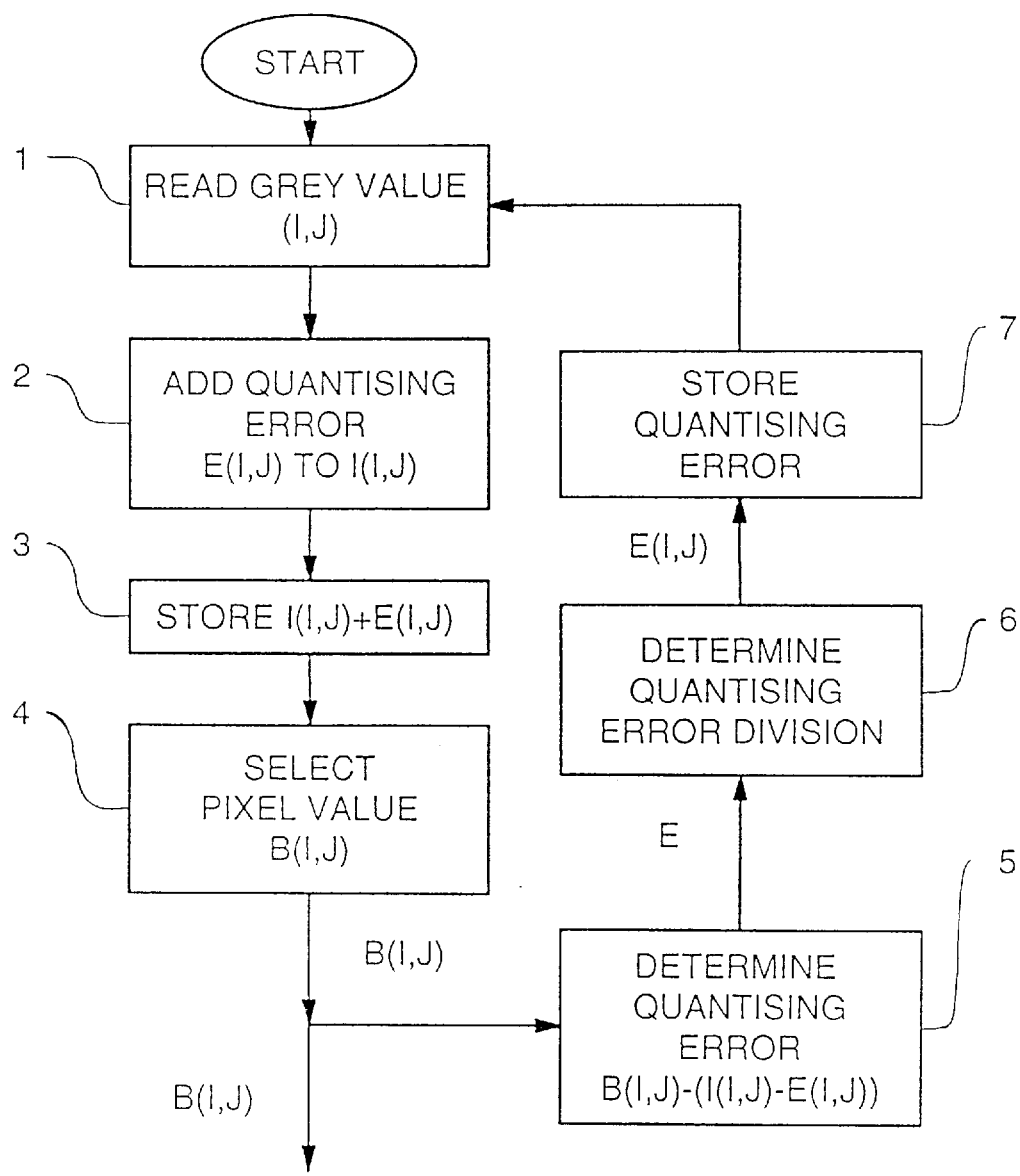
FIG. 1 shows a known method of performing error diffusion.

FIG. 1 diagrammatically illustrates a known method of converting multi-valued grey values I(i,j) to binary pixel values B(i,j) on the error diffusion principle. The term "grey"

value I(i,j)" is used here to indicate that more than two values can be represented thereby. For example, 256 possible values in the case of a digital 8-bit representation. Grey value in this context can also refer to the intensity of an elementary color, red, green or blue, of a color image split into these colors. The grey values are further specified per pixel, i denoting the column and j the row of an image divided into rows and columns. The grey values I(i,j) are processed successively, for which purpose they are read in successively from left to right per row in step 1. The grey value I(i,j) undergoing processing is modified in step 2 by adding a quantizing error E(i,j) originating from previous processing operations. This modified grey value I(i,j)+E(i,j) is then stored in step 3 and used to select in step 4 a corresponding pixel value B(i,j). This selection is equivalent to comparing the modified grey value with a threshold value and selecting a specific pixel value depending on whether the threshold value is exceeded. In the case of a binary pixel value, this is equivalent to selecting a minimum or maximum degree of coverage. In the case of an 8-bit representation of the pixel value it is therefore 0 or 255. Step 5 determines the difference between the modified grey value I(i,j)+E(i,j) and the pixel value B(i,j). This difference is designated the quantizing error E. This error E is divided up into fractions E(i,j) in step 6 and stored in step 7. In following processing steps these fractions are then again added in step 2 to grey values from predetermined neighboring pixels still requiring processing. A quantizing error that has been made is thus compensated in following processing steps so that the average grey value impression over a larger number of pixels corresponds to the required grey value.

Figure 2:
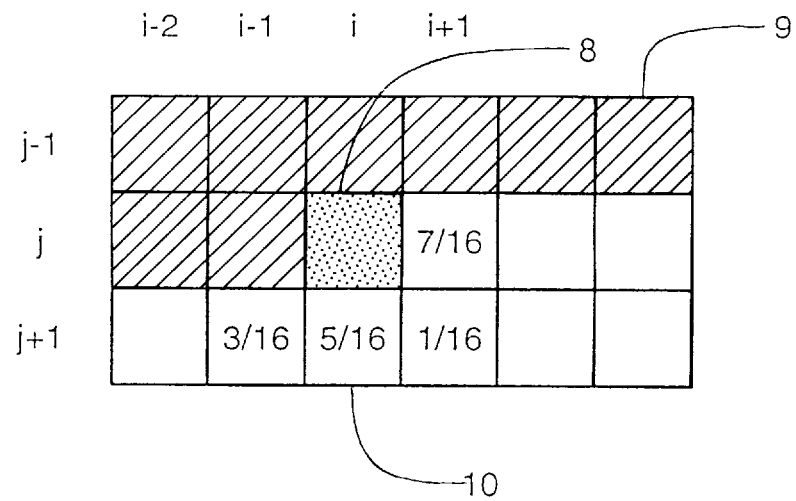
FIG. 2. is a known Floyd-Steinberg quantizing error division.

FIG. 2 shows one possible division of the quantizing error E according to Floyd-Steinberg. The quantizing error E originating from the pixel 8 under processing in column i and row j is divided up over these pixels in accordance with the fractions shown in the pixels 10. The pixels 9 which have already been processed are shown with hatching. This division shifts together with the next pixel for processing in row j and column i+1; and then also in the line from left to right and then per line from top to bottom.

Figure 4:
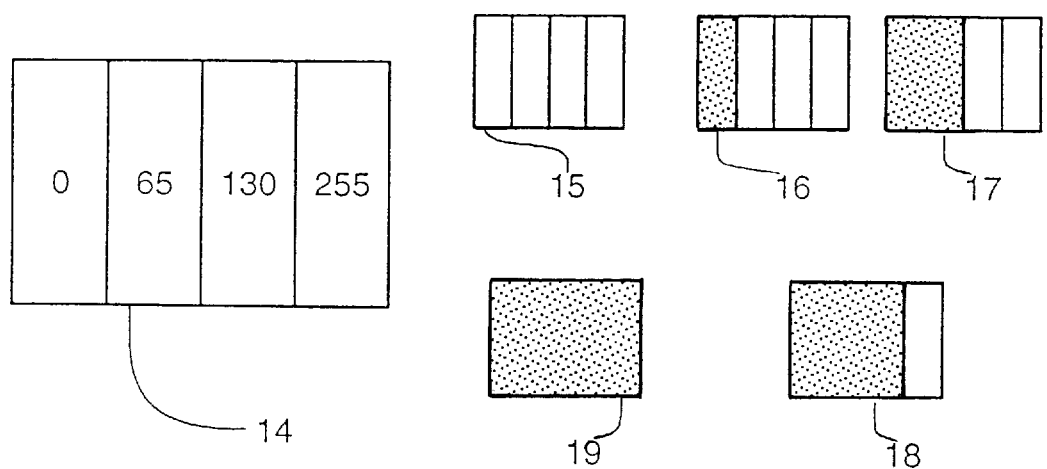
FIG. 4 shows the location of sub-pixels in a pixel.

FIG. 4 shows a possible division of a pixel 14 into sub-pixels. Sub-pixels can be distinguished from pixels, for example in that they are not separately addressable. This is the case if sub-pixels can only be activated by indicating for a pixel position (i,j) the number of sub-pixels to be located for that position. For example, it may happen that a pixel is not activated with two pixel values but with a number of group values, a group value corresponding to the number of sub-pixels for reproduction. In FIG. 4, for example, four possible group values are given in pixel 14: 0, 65, 130 and 255 in the case of an 8-bit representation of a group value. In this case too, of course, it is sufficient, for example, to use a 3-bit representation with 0, 1, 2, 3 and 4 for the number of sub-pixels for reproduction. In this example, the respective group values 0, 65, 130 and 255 correspond to the pixel values of the sub-pixels as indicated with the pixels 15, 16, 17, 18 and 19, respectively. In the case of sub-pixels, the limit of reliable reproducibility is frequently used. An isolated sub-pixel is then often no longer possible to locate reproducibly. Identical pixel values are therefore given, for example, in the way shown in FIG. 4, to groups of contiguous sub-pixels.

Figure 3:
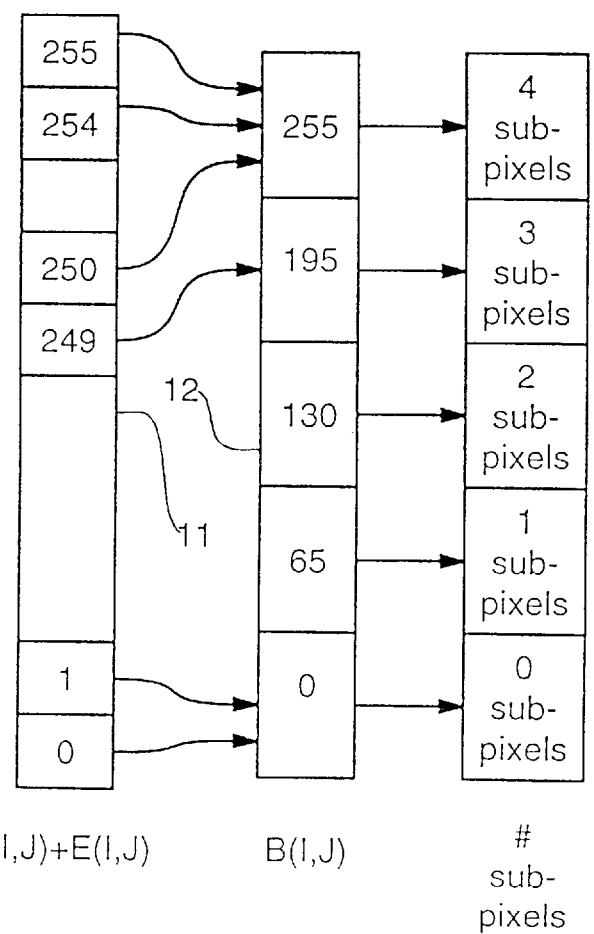
FIG. 3 shows the relationship between grey values, group values and sub-pixels in the method.

FIG. 3 shows the relationship between the possible grey values I(i,j)+E(i,j) in Table 11, the possible group values B(i,j) in Table 12 and the corresponding possible numbers of sub-pixels in Table 13. In contrast to the method described in connection with FIG. 1, B(i,j) now denotes a group value and not a pixel value. Locating these sub-pixels takes place as described in FIG. 4.

Figure 7:
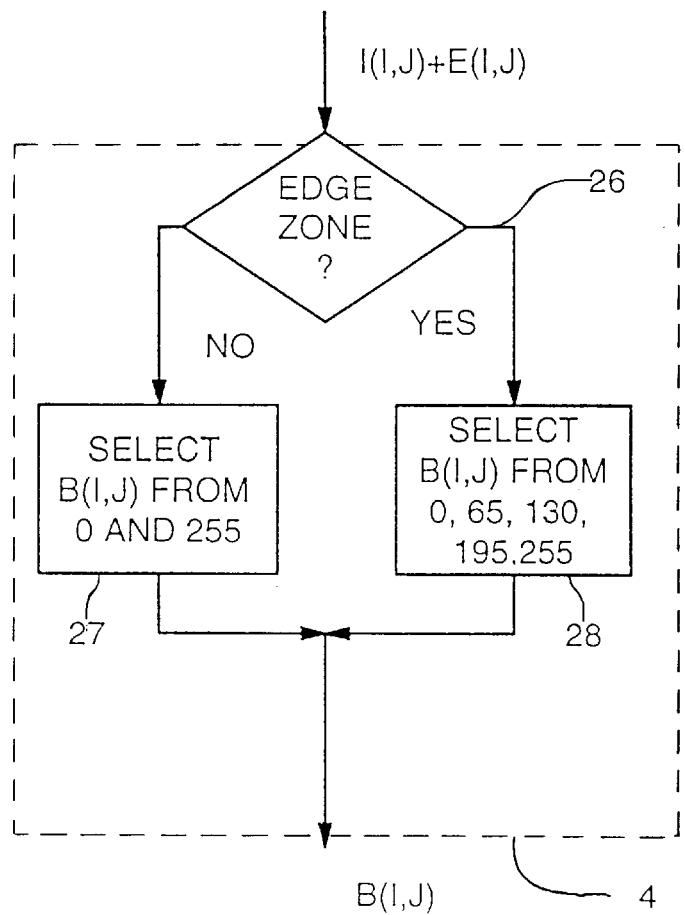
FIG. 7 shows the selection of a group value in accordance with the invention.

According to the invention, the selection step 4 in FIG. 1 is expanded as shown in FIG. 7. In this, step 26 first determines whether the grey value I(i,j)+E(i,j) supplied belongs to a pixel forming part of an edge zone. If so, step 28 selects a group value B(i,j) from five possible group values (0, 65, 130, 195, 255) as shown in FIG. 3. However, if the grey value belongs to a pixel which does not form part of an edge zone, step 27 selects a group value B(i,j) from a maximum of two possible group values 0 and 255. Since these are the minimum and maximum group values, either no individual sub-pixel is located or else just all the sub-pixels having the same pixel value. The effect of this is a clustering of sub-pixels in non-edge zones. This prevents the location of non-reproducible loose sub-pixels as a result of isolated subpixels formed by error diffusion. On the other hand, loose sub-pixels are permissible in edge zones. This gives the advantage of retaining edge sharpness. This is based on the principle that the risk of loose isolated pixels is smaller in edge zones than in non-edge zones. The reason for this is that there is usually already a clustering of pixels directed towards the edge at edges in order to effect the required intensity transition.

Figure 6:
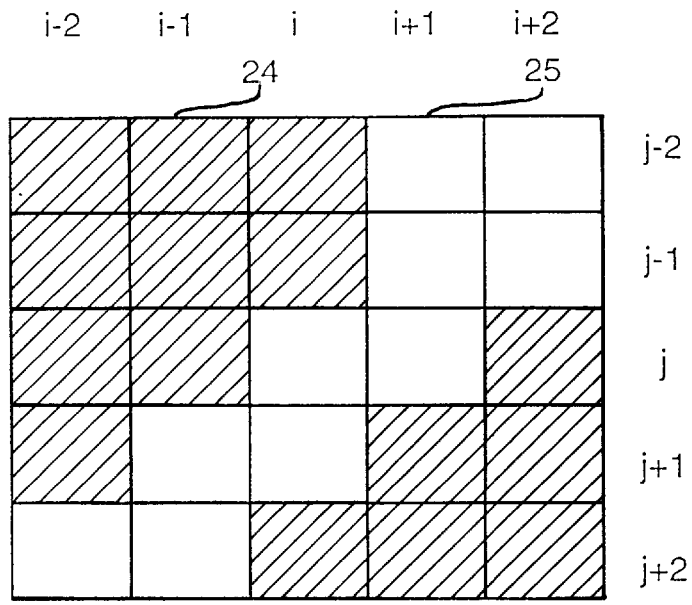
FIG. 6 shows an edge zone of the image illustrated in FIG. 5.

FIG. 6 is an example of how a division of pixels by edge zone can appear. The hatched pixels 24 do not belong to an edge zone while the non-hatched pixels 25 form part of an edge zone. The way in which this division can be made will be discussed hereinafter.

Figure 5:
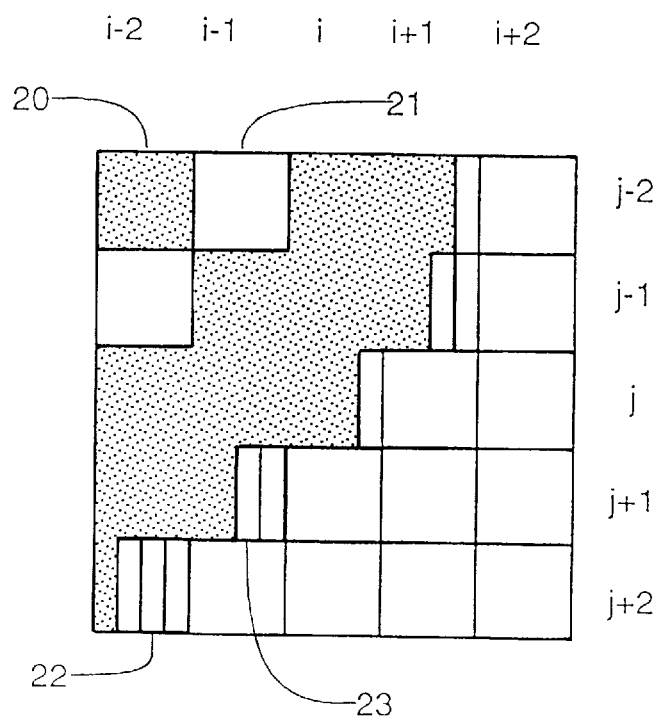
FIG. 5 is a first example of the location of sub-pixels in an image according to the invention.

On the basis of this distribution of pixels in edge zones as shown in FIG. 6, the selection step as shown in FIG. 7, and the allocation of pixel value to sub-pixels as shown in FIG. 4, the final reproduction obtained is as shown in FIG. 5. Only whole pixels occur in the non-edge zones at the top left and bottom right: either a blank pixel 21 with no individual reproduced sub-pixel or a completely black pixel 20 with a maximum number of reproduced sub-pixels having the same pixel value. In contrast, the separate sub-pixels can be distinguished from the pixels in the edge zone: for example pixel 22 with one reproduced sub-pixel or pixel 23 with two reproduced sub-pixels. In this example it is clear that such separate sub-pixels are not isolated in the edge zone. The reproducibility of such loose sub-pixels adjoining whole pixels is usually better than if they were isolated. One advantageous implementation method could be obtained by distinguishing the side of an edge zone on which the reproduced whole pixels are situated and then locating the separate sub-pixels adjoiningly. Or else the separate sub-pixels could be reproduced in those zones where there are the most sub-pixels.

Figure 8:
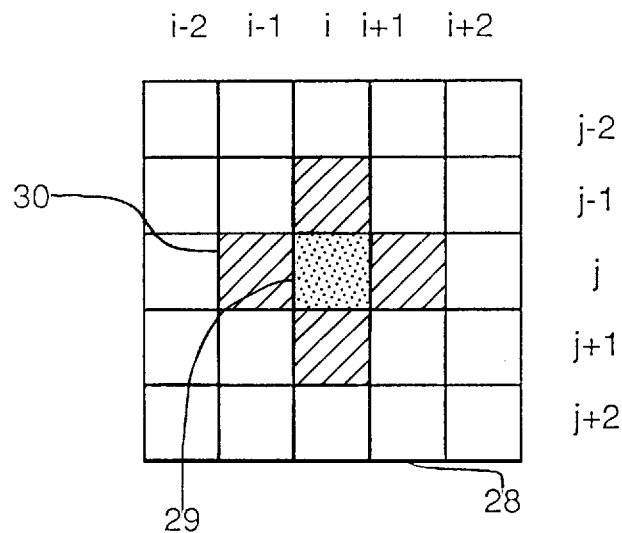
FIG. 8 is a first example of edge zone detection.

FIG. 8 is a diagram of a first example showing how the presence of an edge zone could be determined. The window illustrated in a size of 5x5 pixels is pushed over the entry image with grey values or the output image with pixel values, each position for the central pixel 29 involving determining whether it forms part of an edge zone. For that purpose, the minimum and maximum pixel values are determined of the blank non-hatched pixels 28. If the difference exceeds a specific value then this is termed an edge transition.

Figure 9:
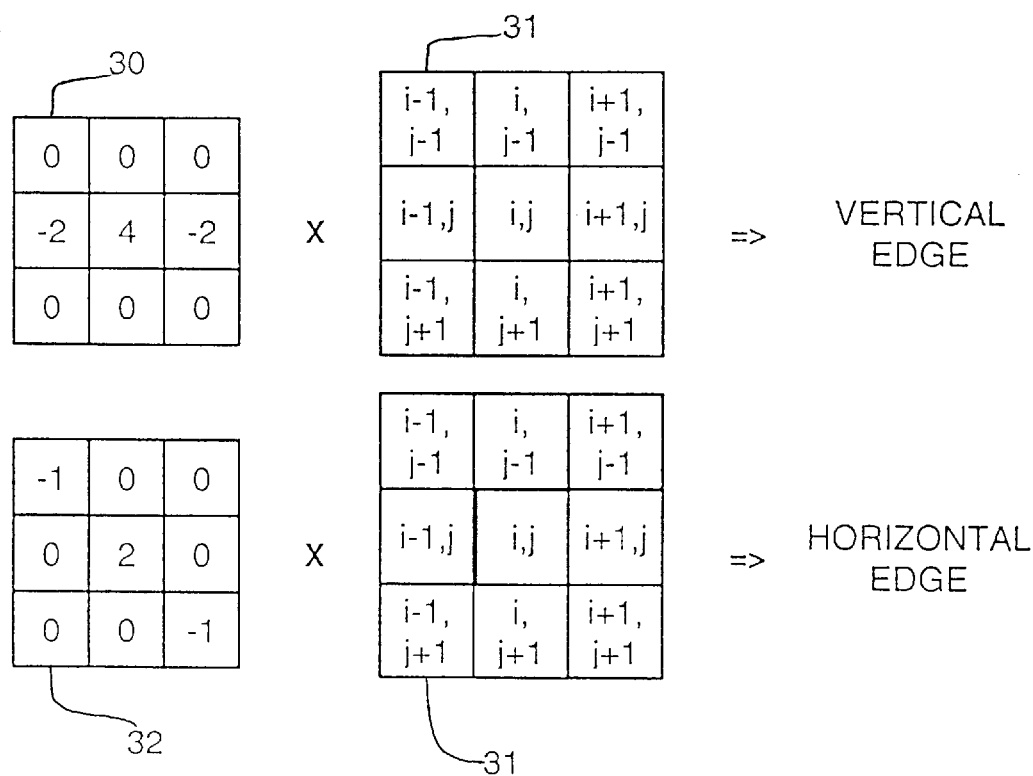
FIG. 9 is a second example of edge zone detection.

FIG. 9 diagrammatically illustrates a second example of how the presence of an edge zone can be determined. This method is based on filtering the pixel image with a digital filter. The latter is formed by a matrix multiplication of the matrix shown at 30 with the pixel or grey values of the pixel positions shown at 31 and repeating this for each pixel position i,j. Such processing results in an output image in which vertical edges are strongly pronounced. After suitable thresholding, only these edges can remain. A similar filtering can be carried out for the other edges. For example using a filter 32 for diagonal edges.

The method according to the invention is not limited to error diffusion with sub-pixels. All methods with error diffusion in which clustering of pixels or sub-pixels can be obtained can be considered. The invention can also be applied advantageously in a method in which dither matrices are activated completely or partly in accordance with an error diffusion method.

Figure 11:
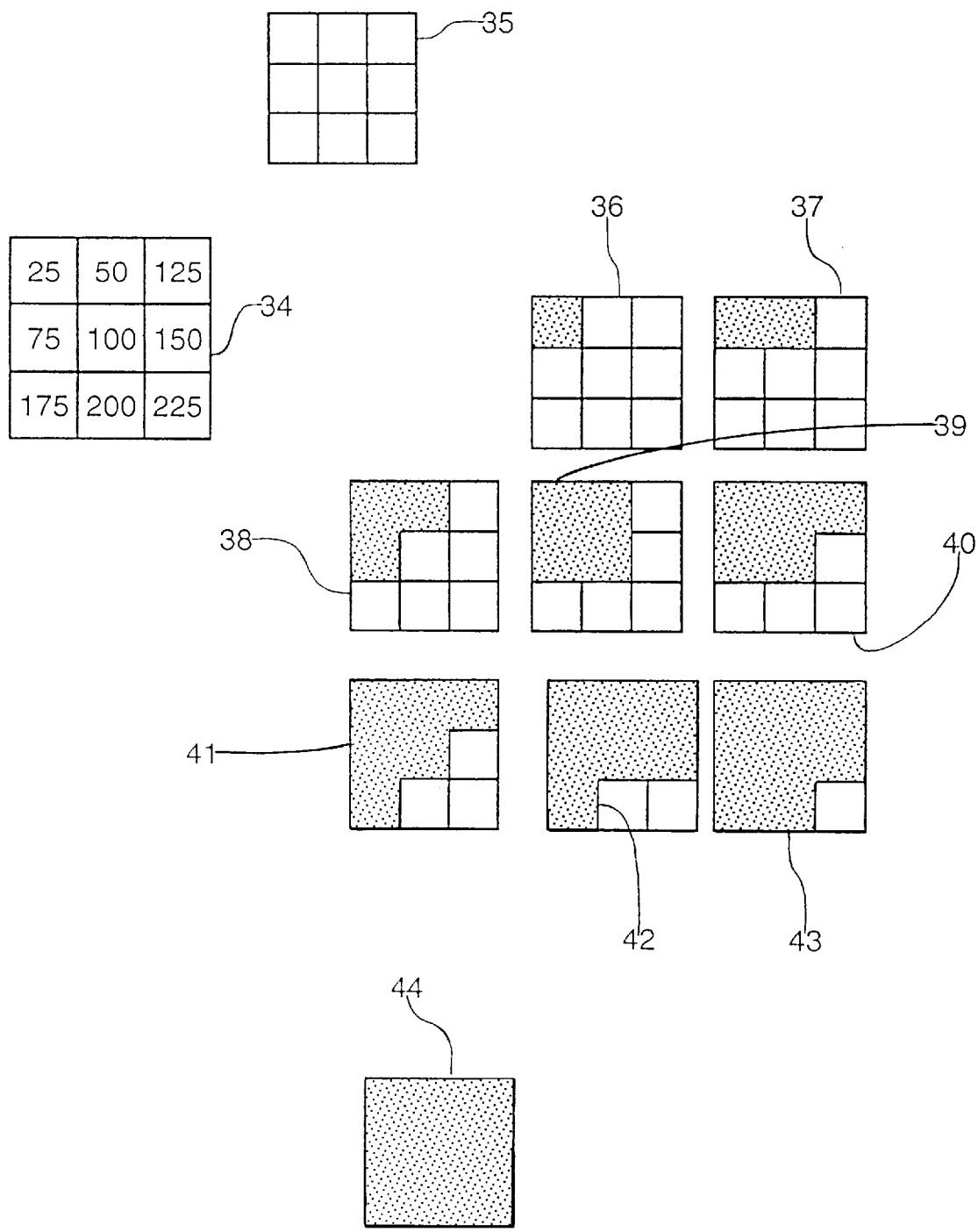
FIG. 11 shows the location of pixels in a dither matrix.

FIG. 11 gives an example of a dither matrix 34 of a size equal to a group of 3×3 pixels. It must be remembered here that a group value B(i,j) again—just as in the above-described embodiment with a group of sub-pixels—now activates such a group of pixels as a whole and not each pixel separately. The group of pixels is accordingly addressed with one row and column value. Thus instead of one pixel subdivided into sub-pixels, as described in the first embodiment, we are now concerned with a kind of super-pixel subdivided into a number of pixels.

Only those pixels whose corresponding dither matrix level is lower than the group value B(i,j) are located with a given group value B(i,j). The various dither matrix levels are also shown in the dither matrix 34 for an output value range from 0 to 255. The pixel values are shown successively at 35 to 44 with increasing magnitude of group values B(i,j). Giving pixel values to the pixels takes place in groups in order to avoid reproducing isolated pixels. A dither matrix in which this is achieved is also described as being of the dot-centered type.

Figure 12:
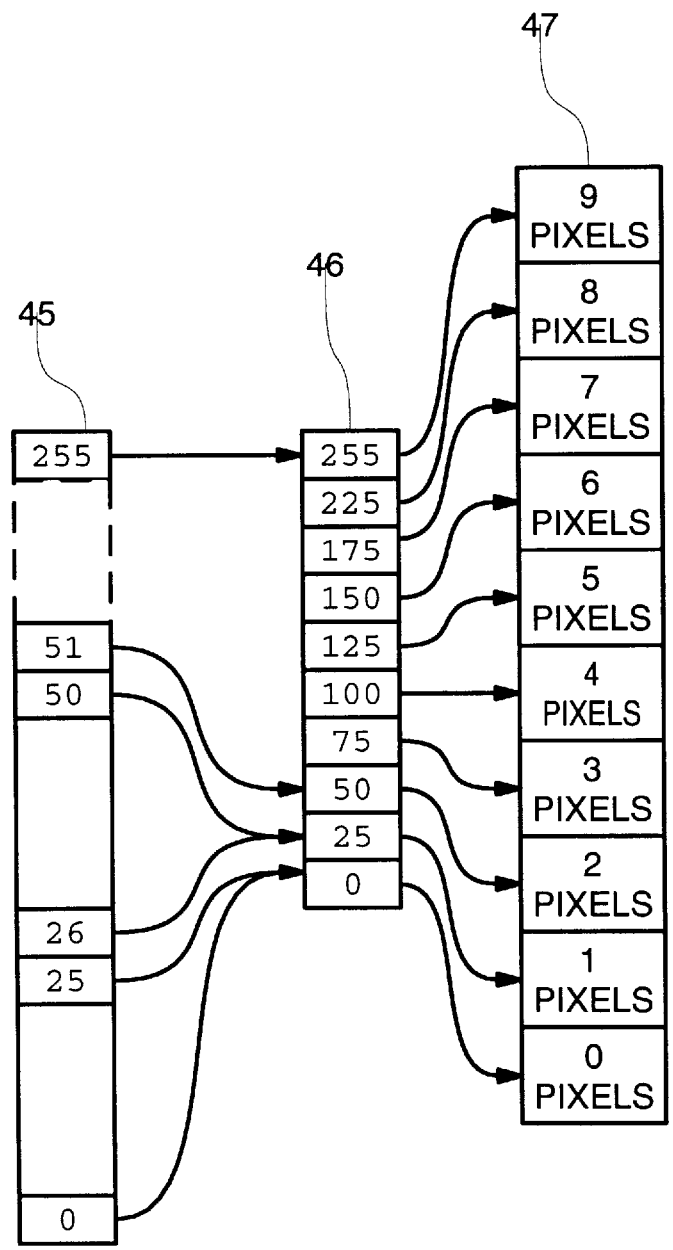
FIG. 12 shows the relationship between grey values, group values and pixels in a dither matrix.

FIG. 12 shows in tabular form the relationship between the grey values I(i,j) (45), the possible group values B(i,j) (46) and the number of pixels (47) for reproduction as applicable in the case of the dither matrix described in FIG. 11. Just as is the case with the above-described sub-pixel reproduction, the method in which a group value B(i,j) is selected may vary. For example it is possible by comparing a grey value with a threshold value or by means of LookUp table. The group value B(i,j) can also be expressed by means of an 8-bit digital word having the values shown in Table 46 or for example by means of a 4-bit digital word having the numbers of pixels shown in Table 47. What is essential for the method according to the invention, however, is the possibility of selection from a number of possible pixel values in accordance with the dot-centered type.

According to a second embodiment of the invention, the selection step 4 is FIG. 1 is performed in similar manner to that shown in FIG. 7. In this second embodiment, step 27 selects from three possible output values B(i,j) following from a minimum, an average and a maximum dither matrix level, namely 0, 100 and 255. This leads to clustered pixels as shown at 35, 39 and 44 in FIG. 11. Step 8 again selects from all the possible group values B(i,j) as enumerated in Table 46 in FIG. 12.

Figure 10:
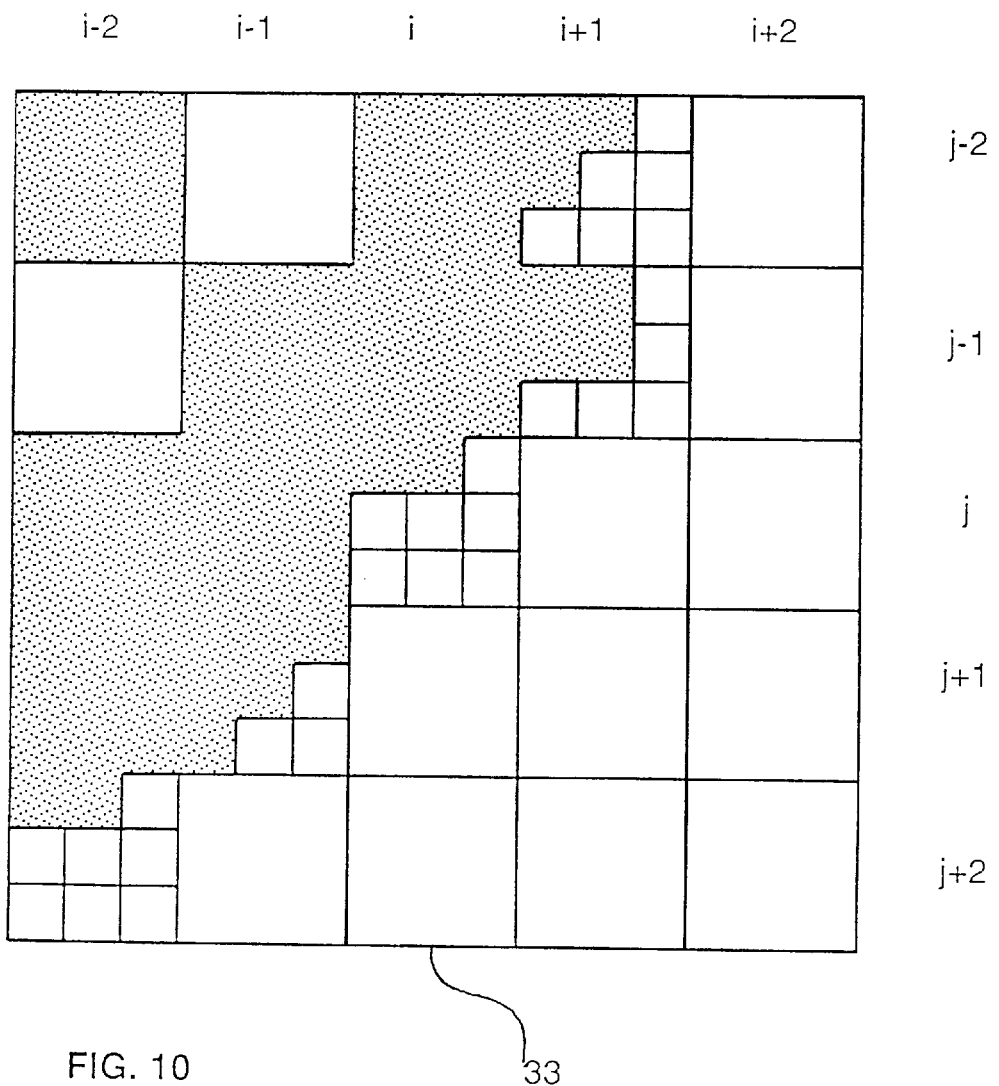
FIG. 10 is a second example of the location of pixels in a dither matrix in an image according to the invention.

An example of an output image having an edge zone as shown in FIG. 6 obtained by giving pixel values to pixels in accordance with the above-described dither matrix and the associated selection mechanism is shown in FIG. 10.

The zone 33 in the non-edge zones are constructed either from all nine pixels black or all nine pixels white. All possible pixel values are permitted in the edge zone. only two pixels have the pixel value for black in, for example, column i-2 and row j+2. In this example it will be seen that these two pixels need not occur in isolation, since a clustering of other pixels towards the edge takes place in an edge zone. The risk that such a small cluster of pixels will occur in isolation is minimal in an edge zone. Even if such a small cluster of pixels is located in isolation in an edge zone, there will still be sufficient larger clusters of pixels in the immediate vicinity. There will be no great consequences if such a small cluster is not reproduced in a sufficiently stable manner.

The above-described two implementation methods according to the invention can be embodied in various ways. For example, as an algorithm in a general computer for the purpose of generating pixel signals for a reproduction device. Alternatively, as hardware in the form of the electronic circuits required, e.g. comparators, summators, LookUp tables and the like. These circuits can be integrated to varying degrees in a single component, e.g. in the form of a specifically designed IC or Logic Cell Array.

Figure 13:
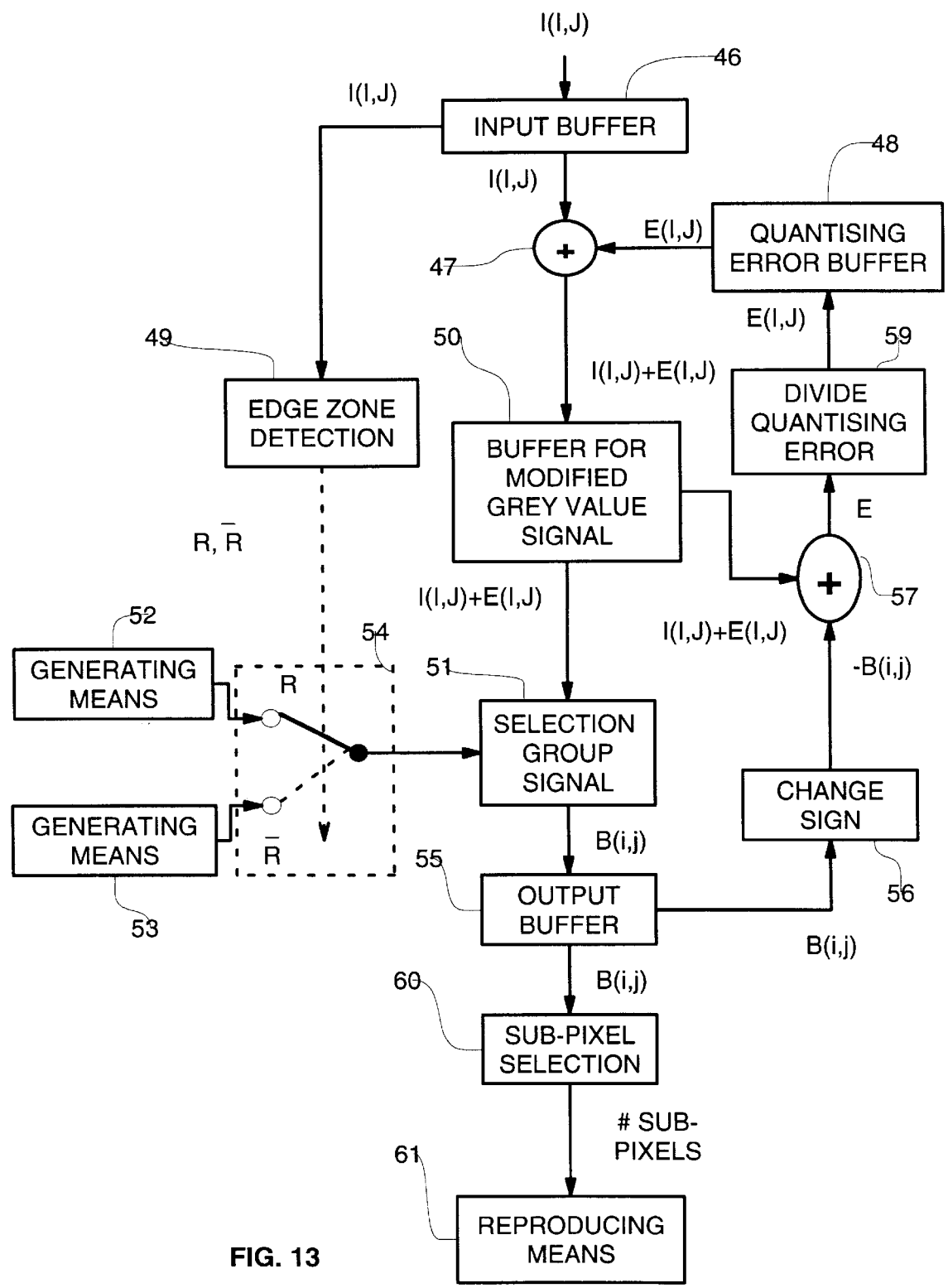
FIG. 13 shows an image processing device in accordance with the invention.

FIG. 13 is a diagram showing one possible construction of an image reproducing device according to the invention. Grey value signals I(i,j) are temporarily stored in an input buffer 46. In the case of a 5×5 pixel window for the detection of edge zones the input buffer 46 comprises five image lines. A summator 47 modifies an input signal I(i,j) with an error signal I(i,j) originating from a quantizing error buffer 48. The thus modified grey value signal I(i,j)+E(i,j) is then fed to selection means 51 via a buffer 50. The selection means 51, on the basis of the modified grey value signal fed thereto, select a group signal B(i,j) which is generated either by generating means 52 or generating means 53. Generating means 52 generate more group signals B(i,j) in accordance with FIG. 1 or FIG. 12. Generating means 53, however, generate a limited set of group signals B(i,j) in accordance with the described implementation method so that a minimum number of contiguous pixels are given an identical pixel value. According to the first implementation method the group values 0 and 255, according to the second implementation method the group values 0, 125 and 255. The selection of these means is in turn determined by the output signal (R, $\overline{R}$) of the edge zone detection means 49. R in the case that the current pixel belongs to an edge zone and $\overline{R}$ if this is not the case. This output signal R or $\overline{R}$ controls selection of generating means 52 or 53 respectively with the aid of switching means 54.

The selected group signals B(i,j) are fed to and stored in an output buffer 55. On the basis of a group signal B(i,j) the pixel values of the sub-pixels for reproduction are chosen by sub-pixel location means 60. These sub-pixel value signals are then fed to digital reproducing means 61 such as an electrographic printer with a laser or an LED as imaging unit or an inkjet printer.

In the case of an integrated reproduction system, such as a digital copying machine, the grey values signals I(i,j) originate from a scanner. The distinction between reproducing means and the image processing means are accordingly less strict. The reproducing means can, for example, perform part of the image processing such as giving pixel values to the sub-pixels on the basis of the group signal supplied.

It should also be noted that reproduction means 61 may also include a monitor display.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of reproducing grey values by allocating pixel values to pixels of an image divided up into groups of contiguous pixels, on a reproduction medium, wherein a pixel corresponds to a zone of a required size and a degree of coverage corresponding to a pixel value, the method comprising the following steps per grey value for a group of pixels:

selecting a group value from a set of possible group values;

determining a quantizing error which is the difference between the selected group value and the grey value;

dividing at least a part of the quantizing error over grey values for neighboring groups of pixels;

allocating pixel values to the pixels of the group of pixels on the basis of the group value, wherein the allocating of pixel values to pixels of the group of pixels occurs in accordance with either a first instruction or in accordance with a second instruction differing therefrom, the second instruction differing from the first by exclusively allocating mutually identical pixel values to two or more contiguous pixels of the group of pixels and selecting one of these instructions on the basis of a predetermined selection criterion based on grey values for neighboring pixel groups or pixel values of neighboring pixels.

2. The method according to claim 1, and including the further steps of:

distinguishing pixels which form part of edge zones in the image, in accordance with the selection criterion;

allocating pixel values in accordance with the first instruction to the pixels which correspond to an edge zone; and allocating pixel values according to the second instruction to the other pixels.

3. The method according to claim 1, wherein at least a number of possible group values each correspond to two or more contiguous pixels with mutually identical degrees of coverage in the group, wherein dividing the set of group values into a first subset of group values and a second subset of group values wherein the first subset can comprise the complete set and the second set only contains group values which correspond to two or more contiguous pixels having mutually identical pixel values in the group of pixels, the method further comprising the following steps of:

selecting a group value from the first set of group values in accordance with the first instruction; and selecting a group value from the second set of group values in accordance with the second instruction.

4. The method according to claim 2, wherein at least a number of possible group values each correspond to two or more contiguous pixels with mutually identical degrees of coverage in the group, wherein dividing the set of group values into a first subset of group values and a second subset of group values wherein the first subset can comprise the complete set and the second set only contains group values which correspond to two or more contiguous pixels having mutually identical pixel values in the group of pixels, the method further comprising the following steps of:

selecting a group value from the first set of group values in accordance with the first instruction; and selecting a group value from the second set of group values in accordance with the second instruction.

5. The method according to claim 3, comprising allocating pixel values in a group of pixels in accordance with a dither matrix of the dot-centered type, wherein the separate group values correspond to the separate dither matrix levels, and including the following steps:

selecting from all the group values in accordance with the first instruction; and selecting from a first and a second group value corresponding to the minimum and maximum dither matrix levels respectively in accordance with the second instruction.

6. The method according to claim 4, comprising allocating pixel values in a group of pixels in accordance with a dither matrix of the dot-centered type, wherein the separate group values correspond to the separate dither matrix levels, and including the following steps:

selecting from all the group values in accordance with the first instruction; and selecting from a first and a second group value corresponding to the minimum and maximum dither matrix levels respectively in accordance with the second instruction.

7. The method according to claim 3, comprising allocating pixel values to a group of not separately addressable pixels wherein the group values correspond to a number of pixels for reproduction in the group, and including the following steps:

selecting from all the group values in accordance with the first instruction; and selecting from a first and a second group value respectively corresponding to the minimum and maximum number of pixels for reproduction in the group in accordance with the second instruction.

8. The method according to claim 4, comprising allocating pixel values to a group of not separately addressable pixels wherein the group values correspond to a number of pixels for reproduction in the group, and including the following steps:

selecting from all the group values in accordance with the first instruction; and selecting from a first and a second group value respectively corresponding to the minimum and maximum number of pixels for reproduction in the group in accordance with the second instruction.

9. An image reproduction device for reproducing grey values by generating pixel signals for pixels of an image divided up into groups of contiguous pixels, on a reproduction medium, wherein a pixel corresponds to a zone of the required size and a degree of coverage corresponding to a pixel signal, the device comprising:

inputting means for receiving grey value signals representing grey values;

quantizing means for converting the grey value signals to pixel signals suitable for supply to reproduction means;

reproduction means for reproducing the pixels on the reproduction medium as a function of the pixel signals;

wherein the quantizing means comprise:

generating means for generating a group signal for each grey value signal for a group of pixels;

quantizing error determining means for determining a quantizing error signal which is the difference between a generated group signal and the corresponding grey value signal; and dividing means for adding at least a part of the quantizing error signal to grey value signals for neighboring groups of pixels, the device further comprising allocating means for generating pixel signals for the pixels of the group of pixels as a function of the group signal, wherein the device is suitable for generating a group signal and corresponding pixel signals for pixels of the group of pixels either in the first operating mode or in a second operating mode differing therefrom, wherein the second operating mode leads solely to mutually identical pixel signals for two or more contiguous pixels; and the device comprises segmentation means for activating one of said operating modes for a group of pixels on the basis of a predetermined selection criterion based on grey value signals for neighboring pixel groups or pixel signals of neighboring pixels.

10. The image reproduction device according to claim 9, wherein the segmentation means comprise edge detection means for distinguishing pixels which form part of edge zones in the image by reference to a switching signal fed by the edge detection means the device in the first operating mode is active for pixels which form part of edge zones while in the second operating mode the device is active for pixels which do not form part of the edge zones.

11. The image reproduction device according to claim 9, wherein at least a number of possible group signals each correspond to two or more contiguous pixels having mutually identical degrees of coverage in a group, wherein the device is suitable for generating first or second group signals;

the second group signals correspond solely to mutually identical pixel signals for two or more contiguous pixels in the group, the generating means further being suitable for generating a first group signal in the first operating mode and generating a second group signal in the second operating mode.

12. The image reproduction device according to claim 10, wherein at least a number of possible group signals each correspond to two or more contiguous pixels having mutually identical degrees of coverage in a group, wherein the device is suitable for generating first or second group signals;

the second group signals correspond solely to mutually identical pixel signals for two or more contiguous pixels in the group, the generating means further being suitable for generating a first group signal in the first operating mode and generating a second group signal in the second operating mode.

13. The image reproduction device according to claim 11, wherein the generating means are suitable for generating pixel signals according to a dither matrix of the dot-centered type and wherein the separate group signals correspond to the separate dither matrix levels, wherein selection means are suitable for generating in the second operating mode second group signals corresponding either to the minimum or maximum dither matrix level.

14. The image reproduction device according to claim 12, wherein the generating means are suitable for generating pixel signals according to a dither matrix of the dot-centered type and wherein the separate group signals correspond to the separate dither matrix levels, wherein selection means are suitable for generating in the second operating mode second group signals corresponding either to the minimum or maximum dither matrix level.

15. The image reproduction device according to claim 11, wherein the generating means are adapted to generate pixel signals for a group of non-separately addressable pixels and wherein the group signals correspond to a number of pixels for reproduction in the group, wherein the generating means are adapted to generate a first and a second group signal in the second operating mode, such signals corresponding to the minimum and maximum number of pixels for reproduction in the group respectively.

16. The image reproduction device according to claim 12, wherein the generating means are adapted to generate pixel signals for a group of non-separately addressable pixels and wherein the group signals correspond to a number of pixels for reproduction in the group, wherein the generating means are adapted to generate a first and a second group signal in the second operating mode, such signals corresponding to the minimum and maximum number of pixels for reproduction in the group respectively.

17. An image reproduction system for reproducing grey values by generating pixel signals for pixels of an image divided up into groups of contiguous pixels, on a reproduction medium, wherein a pixel corresponds to a zone of the required size and a degree of coverage corresponding to a pixel signal, the system comprising:

an input for receiving grey value signals representing grey values;

a quantizer converting the grey value signals to pixel signals suitable for supply a reproduction member, said reproduction member reproducing the pixels on the reproduction medium as a function of the pixel signals;

said quantizer including:
a generator device for generating a group signal for each grey value signal for a group of pixels;
a quantizer error determining member for determining a quantizing error signal which is the difference between a generated group signal and the corresponding grey value signal; and
a divider device for adding at least a part of the quantizing error signal to grey value signals for neighboring groups of pixels, the system further comprising an allocator for generating pixel signals for the pixels of the group of pixels as a function of the group signal, wherein the device is suitable for generating a group signal and corresponding pixel signals for pixels of the group of pixels either in the first operating mode or in a second operating mode differing therefrom, wherein the second operating mode leads solely to mutually identical pixel signals for two or more contiguous pixels; and the system comprises a segmentation device for activating one of said operating modes for a group of pixels on the basis of a predetermined selection criterion based on grey value signals for neighboring pixel groups or pixel signals of neighboring pixels.

18. The image reproduction system according to claim 17, wherein the segmentation device includes an edge detection member for distinguishing pixels which form part of edge zones in the image by reference to a switching signal fed by the edge detection means the system in the first operating mode is active for pixels which form part of edge zones while in the second operating mode the system is active for pixels which do not form part of the edge zones.

19. The image reproduction system according to claim 17, wherein at least a number of possible group signals each correspond to two or more contiguous pixels having mutually identical degrees of coverage in a group, wherein the system is suitable for generating first or second group signals;

the second group signals correspond solely to mutually identical pixel signals for two or more contiguous pixels in the group, the generator device further being suitable for generating a first group signal in the first operating mode and generating a second group signal in the second operating mode.

20. The image reproduction system according to claim 19, wherein the generator device is suitable for generating pixel signals according to a dither matrix of the dot-centered type and wherein the separate group signals correspond to the separate dither matrix levels, wherein a selection device is suitable for generating in the second operating mode second group signals corresponding either to the minimum or maximum dither matrix level.

21. The image reproduction system according to claim 18, wherein the generator device is adapted to generate pixel signals for a group of non-separately addressable pixels and wherein the group signals correspond to a number of pixels for reproduction in the group, wherein the generator device is adapted to generate a first and a second group signal in the second operating mode, such signals corresponding to the minimum and maximum number of pixels for reproduction in the group respectively.

* * * * *